(12) United States Patent
Barber et al.

(10) Patent No.: US 7,831,253 B2
(45) Date of Patent: Nov. 9, 2010

(54) METHOD AND SYSTEM FOR ERROR HANDLING IN WIRELESS COMMUNICATION NETWORKS

(75) Inventors: Phillip Barber, Frisco, TX (US); Zhixian Xiang, San Diego, CA (US)

(73) Assignee: FutureWei Technologies, Inc., Plano, TX (US)

( * ) Notice: Subject to any disclaimer, the term of this patent is extended or adjusted under 35 U.S.C. 154(b) by 778 days.

(21) Appl. No.: 11/752,840

(22) Filed: May 23, 2007

(65) Prior Publication Data

US 2008/0076424 A1 Mar. 27, 2008

Related U.S. Application Data

(60) Provisional application No. 60/846,447, filed on Sep. 21, 2006, provisional application No. 60/846,571, filed on Sep. 21, 2006.

(51) Int. Cl.
*H04W 36/00* (2009.01)
(52) U.S. Cl. .................. 455/436; 455/432.1; 455/456.1
(58) Field of Classification Search ................. 455/436, 455/432.1, 456.1
See application file for complete search history.

(56) References Cited

U.S. PATENT DOCUMENTS

| 6,879,830 | B1 | 4/2005 | Vollmer et al. |
| 7,072,651 | B2 * | 7/2006 | Jiang et al. ............... 455/432.1 |
| 2004/0121771 | A1 | 6/2004 | Song et al. |
| 2005/0101326 | A1 | 5/2005 | Kang et al. |
| 2006/0009228 | A1 | 1/2006 | Kang et al. |
| 2009/0296659 | A1 * | 12/2009 | Lim et al. .................... 370/331 |

FOREIGN PATENT DOCUMENTS

| CN | 1761224 A | 4/2006 |
| EP | 1513364 A2 | 3/2005 |
| WO | WO 0035226 A1 | 6/2000 |

OTHER PUBLICATIONS

PCT International Search Report of PCT/CN2007/070745, form PCT/ISA/210, mailed Dec. 27, 2007, Applicant: Huawei Technologies Co., Ltd., et al., 5 pages.
PCT Written Opinion of the International Sewarching Authority for PCT/CN2007/070745, form PCT/ISA/237, mailed Dec. 27, 2007, Applicant: Huawei Technologies Co., Ltd., et al., 4 pages.

* cited by examiner

*Primary Examiner*—Barry W Taylor
(74) *Attorney, Agent, or Firm*—Slater & Matsil, L.L.P.

(57) ABSTRACT

Method and system for error handling in wireless communication networks. According to an embodiment, the present invention provides a method of providing wireless services. The method includes providing a wireless communication network. The wireless communication network includes a wireless device, a first access network and a second access network. The first access network includes a first data associated with the wireless device. The method also includes sending a first request for service by the wireless device to the second access network. The method additionally includes determining by the second access network whether the second access network has a second data for serving the wireless device. Also, the method includes sending a second request by the second access network to the first access network if the second access network does not have the second data. The second request is associated with serving the wireless device.

25 Claims, 4 Drawing Sheets

METHOD AND SYSTEM FOR ERROR HANDLING IN WIRELESS COMMUNICATION NETWORKS

CROSS-REFERENCES TO RELATED APPLICATIONS

This application claims priority to U.S. Provisional Application No. 60/846,447, filed Sep. 21, 2006, which is incorporated by reference herein. This application additionally claims priority to U.S. Provisional Application No. 60/846,571, filed Sep. 21, 2006, which is incorporated by reference herein.

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

BACKGROUND OF THE INVENTION

The present invention relates in general to telecommunication techniques. More particularly, the invention provides a method and system for providing allocation of network resources. In a specific embodiment, the present invention provides a method and system for providing status indication of information associated with wireless devices. Merely by way of example, the invention is described as it applies to a wireless access network, but it should be recognized that the invention has a broader range of applicability.

Techniques for wireless communications have progressed through the years. For example, satellite wireless communication networks have been developed where satellites are used to relay voice communication among wireless devices. There are other techniques as well. Over recent years, "cellular" wireless communication networks have become one of the most widely used technique for providing wireless communication.

A wireless network usually includes base stations and mobile stations. For example, a mobile station (MS) refers to a station that is to be used while in motion or during halts at unspecified geographic locations. As an example, the mobile station is a mobile communication device. In another example, the mobile station is a cellular phone. In yet another example, a base station (BS) refers to a set of equipment that can provide connectivity, management, and control for one or more mobile stations. As merely an example, a connective service network refers to a set of network functions that provide IP connectivity services to mobile stations. In an exemplary process flow, a MS obtains radio access from a BS. Through the BS, the MS obtains IP services.

In a telecommunication network, a mobile station is typically connected to a local network, which provides, among other things, radio connectivity. The local network also establishes a connection between the mobile station and a network where a variety of services (e.g., routing, Internet protocol routing, etc.) are provided. FIG. 1 is a simplified diagram illustrating a conventional telecommunication network. As an example, the conventional telecommunication network 100 as illustrated in FIG. 1 complies with WiMAX wireless (i.e., IEEE Std 802.16d/e) networks.

In FIG. 1, a mobile station 101, which is sometimes referred to as mobile subscriber station when the mobile station is subscribed to a specific network service provider, is connected to an access service network. For example, the mobile station 101 is connected to the access service network (ASN) 102. For example, the ASN 102 is configured to provide radio access to the mobile station 101. According to an embodiment, the ASN 102 includes a base station (BS) for providing radio access. For example, the BS refers to a generalized equipment set for providing connectivity, management, and control of mobile stations. In addition, the ASN 102 includes a gateway for interfacing with other networks. For example, the gateway allows the mobile station 101 to communicate with other ASNs (e.g., ASN 106). As another example, the gateway allows the mobile station 101 to connect to a connectivity service network (CSN) 104. As an example, the connectivity service network refers to a set of network functions that provide, among other things, IP connectivity service to mobile stations. Often, the CSNs also store policies associated with mobile stations.

Typically, a mobile station connects to a CSN that stores the network policies associated with the mobile station through an ASN. As an example, the CSN is often referred as network service provider from a management perspective. Similarly, the ASN is often referred to as network access provider from a management perspective. Typically, the ASN and/or the CSN stores information associated with individual wireless devices. As an example, the information includes location information of a specific wireless device. As another example, the information includes context information for a wireless device.

Specific information associated with wireless devices is useful in many ways. For example, when a MS is connected to a first ASN, the MS may need to switch to a second ASN. Typically, the first ASN is referred as a serving ASN, and the second ASN is referred as a target ASN. The MS may switch from the serving ASN to the target ASN for a variety of reasons. For example, the MS may need to switch to ASN when the MS moves from one geographic service area to another. To transfer from one ASN to another, a handover process is performed. A handover process typically requires location and/or context information associated with the MS. If this information is unavailable, it is often necessary for an ASN to send an error message to the MS and request for information, thus reducing the efficiency of performance of the handover.

In addition, information that is specifically related to a particular MS is useful for other purposes as well. For example, MS's and ASNs often periodically exchange information for various reasons. In a specific example, an MS may periodically provide location update to an ASN when the MS is in an idle mode, a mode of intermittent communication to the network generally used to both reduce power consumption on the MS and network resource consumption on the ASN.

Important as this MS information is, a wireless communication network often does not have data available to exchange and/or serve the MS. Various conventional techniques are currently available to address this problem. Unfortunately, these conventional techniques have been inadequate.

Therefore, an improved method for providing wireless communication network is desired.

BRIEF SUMMARY OF THE INVENTION

The present invention relates in general to telecommunication techniques. More particularly, the invention provides a method and system for providing allocation of network resources. In a specific embodiment, the present invention provides a method and system for providing status indication of information associated with wireless devices. Merely by way of example, the invention is described as it applies to wireless access network, but it should be recognized that the invention has a broader range of applicability.

According to an embodiment, the present invention provides a method of providing wireless services. The method includes providing a wireless communication network. The wireless communication network includes a wireless device, a first access network and a second access network. The first access network includes a first data associated with the wireless device. The method also includes sending a first request for service by the wireless device to the second access network. The method additionally includes determining by the second access network whether the second access network has a second data for serving the wireless device. Also, the method includes sending a second request by the second access network to the first access network if the second access network does not have the second data. The second request is associated with serving the wireless device. In addition, the method includes determining a status indication of the first data by the first access network. The status is based on a plurality of possible errors. The method further includes sending the status indication from the first access network to the second access network. Furthermore, the method includes determining whether to initiate a network initiation process for the wireless device base on the status indication. Network initiation process includes performing a network entry cycle for the wireless device According to another embodiment, the present invention provides a method of providing wireless services. The method includes providing a wireless communication network. The wireless communication network includes a wireless device, a paging controller and a paging agent. The paging controller includes a first data associated with the wireless device. The first data is associated with a location. The method further includes sending a first request for service by the wireless device to the paging agent. The first request is associated with a location update. The method additionally includes determining by the paging agent whether the paging agent has a second data for serving the wireless device. In addition, the method includes sending a second request by the paging agent to the paging controller if the paging agent does not have the second data. The second request is associated with serving the wireless device. The method further includes determining a status indication of the first data by the paging controller. For example, the status is based on a plurality of possible errors. The method also includes sending the status indication from the paging controller to the paging agent. Moreover, the method includes determining whether to initiate a network initiation process for the wireless device base on the status indication.

According to yet another embodiment, the present invention provides a method of providing wireless services. The method includes providing a wireless communication network. For example, the wireless communication network includes a wireless device, a first access network and a second access network. The second access network includes a first data associated with the wireless device. The first data includes a first context information. The method also includes initiating a handover process by the first access network. The method additionally includes determining whether the first access network has a second data for serving the wireless device. The second data includes a second context information associated with the wireless device. The method also includes sending a second request by the first access network to the second access network if the first access network does not have the second data. The second request is associated with serving the wireless device. Moreover, the method includes determining a status indication of the first data by the second access network. The status is based on a plurality of possible errors. The method further includes sending the status indication from the second access network to the first access network. Moreover, the method includes determining whether to initiate a network initiation process for the wireless device base on the status indication.

According to yet another embodiment, the present invention provides a system for providing wireless service to wireless devices. The system includes a wireless device. The system also includes a first access network. The first access network is configured to provide wireless access to the wireless device. The system also includes a second access network. For example, the second access network includes information associated with the wireless device. The first access network determines whether the first access network has a first data. The first data is associated with serving the wireless device. The first access network sends a request to the second access network if the first access network does not have the second data. The request is associated with serving the wireless device. The second access network provides a status indication of the information. The status indication is based on a plurality of possible errors. The second access network sends the status indication to the first access network.

It is to be appreciated that the various embodiments of the present invention provide advantages over conventional techniques. In various embodiments, the present invention provides a scheme for efficient handling of information associated with serving wireless devices. In a specific embodiment, the present invention provides an efficient error handling scheme for handover process. In another embodiment, the present invention provides an effective way to handle idle states of mobile stations. For example, by providing specific indication for information associated with wireless devices, embodiments of the present invention allow network system to operate more effectively. In addition, it is to be appreciated that embodiments of the present invention can be implemented for conventional network techniques and standards. For example, various embodiments of the present invention are compatible with conventional techniques and easily implemented. There are other benefits as well.

Depending upon embodiment, one or more of these benefits may be achieved. These benefits and various additional objects, features and advantages of the present invention can be fully appreciated with reference to the detailed description and accompanying drawings that follow.

DETAILED DESCRIPTION OF THE INVENTION

The present invention relates in general to telecommunication techniques. More particularly, the invention provides a method and system for providing allocation of network resources. In a specific embodiment, the present invention provides a method and system for providing status indication of information associated with wireless devices. Merely by way of example, the invention is described as it applies to wireless access network, but it should be recognized that the invention has a broader range of applicability.

As discussed above, the access network that directly provides services to wireless devices often need specific information, such as location information, context information, etc., associated with the wireless device that is being served. For example, when performing location update operations and/or handover operations, the accesses network needs to use these information. Sometimes, for one reason or another, the information is unavailable. In various conventional techniques, the access network simply indicates to the wireless device that there is an error. In response, the wireless device typically request for re-entry, which is a timing time consuming process that often uses a lot of valuable system resources.

It is to be appreciated that various embodiments of the present invention address this problem and provide an efficient technique for handling situations where specific information for a wireless device is unavailable. In a specific embodiment, certain entity within a network indicates a status for the unavailable information, thereby allowing other network entities to respond accordingly.

Figure 2:
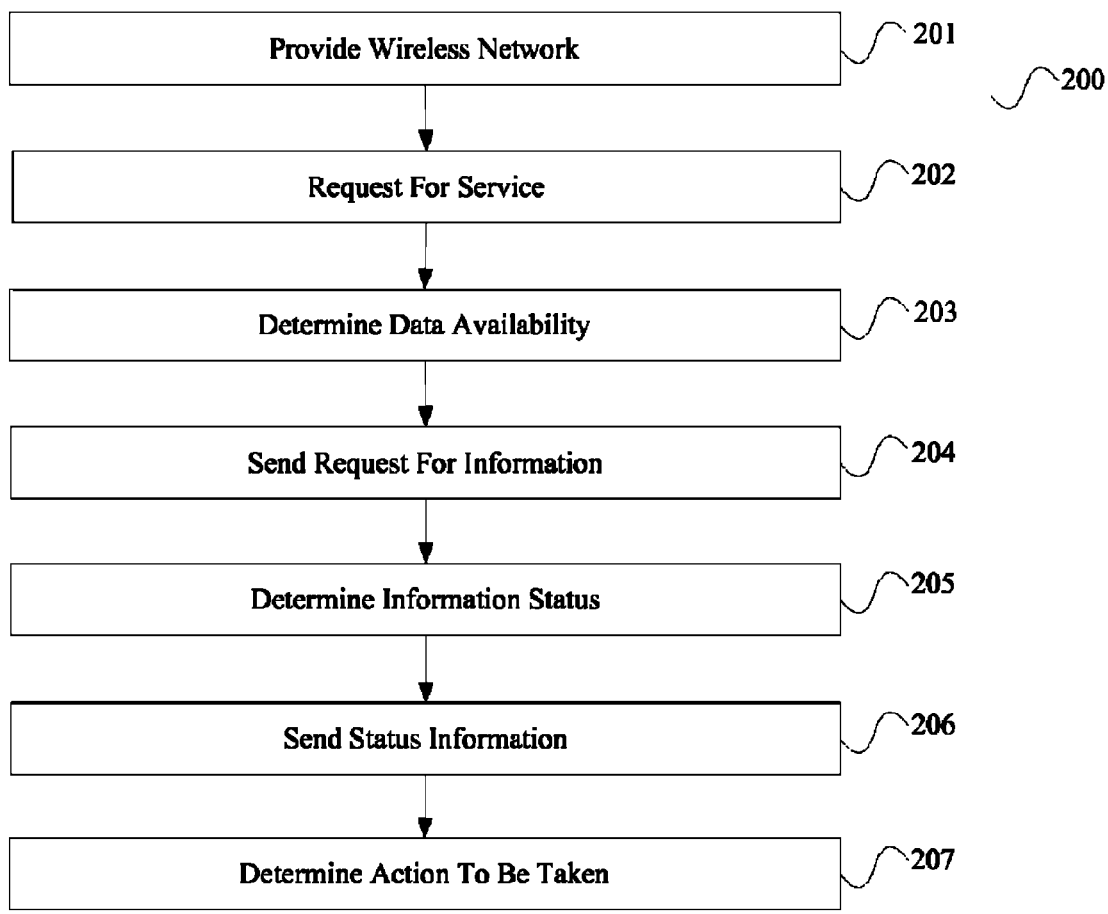
FIG. 2 is simplified diagram illustrating the operation a communication network according to an embodiment of the present invention.

FIG. 2 is simplified diagram illustrating the operation a communication network according to an embodiment of the present invention. This diagram is merely an example, which should not unduly limit the scope of the claims. One of ordinary skill in the art would recognize many variations, alternatives, and modifications. As an example, various steps may be added, removed, repeated, rearranged, replaced, overlapped, and/or partially overlapped.

At step 201, a wireless communication network is provided. According to an embodiment, the wireless communication network including a wireless device, a first access network and a second access network. As an example, the first access network is an authenticator ASN and the second access network is a serving ASN. In a specific embodiment, the authenticator ASN includes a database that stores a first data associated with the wireless device. Depending on the application and the network structure, the first data may include information associated with the identification, location, and/or other information for the wireless devices. In a specific embodiment, the first access network is a paging controller and the second access network is a paging agent. For example, the paging control includes a location register for storing location information associated with the wireless device.

At step 202, the wireless device sends a service request to the second access network. Depending on the application, the service request may be for various purposes. In an embodiment, the service request is simply a location change of the wireless device, indicating that a handover process should be performed. In another embodiment, the service request is a request for periodical location update with the second access network. For example, the wireless device is in a idle states and needs to exchange information with the second wireless network to ensure proper connection.

At step 203, the second access network determines whether the second access network has a second data for serving the wireless device. As explained above, depending on the situation, the second access network may or may not have information for the wireless device. For example, the wireless devices may be migrated into a service area served by the second access network and the second network does not yet have the data that is specifically related to the wireless device. Depending on the situation, the data may be stored by another access network that has previous served the wireless device. As another example, the data may be stored by a location register that is a part of a central networking controlling unit.

At step 204, the second access network sends a request to the first access network if the second access network does not have the second data. For example, the second access network determines that the first access network may have the data that is needed to serve the wireless device and sends the request to the first access network. As another example, the second access network sends a request to a third access network, and the third access network determines that the first access network has the data and relays and request to the first access network. According to various embodiments, the first access network, as explained, stores information associated with the wireless device for many reasons. For example, the first access network has obtained the information from previously serving the wireless device. As another example, the first access network is a centralized server that stores information for many wireless devices in a specific geographic or logical region.

At step 205, the first access network determines the status of the requested information. Depending on the specific situation, the requested information may be permanently unavailable, temporarily unavailable, unavailable for administrative reasons, etc. In certain embodiment, the first access network queries other networks to perform the determination. In a specific embodiment, the first access network includes a controller for determining the status of the requested information.

At step 206, the first access network sends a status indication to the second access network. According to certain embodiments, the status indication is a part of the request response from the first access network to the second access network. For example, the responses include many fields for status indication. In a specific embodiment, the status indication regarding the requested information is a two-bit indicator, with "00" representing "record not found", "01" representing "record temporarily unavailable", "10" representing "record unavailable for administrative reasons", etc.

At step 207, actions are performed based on the status indication. According to an embodiment, the second access network is configured to determine what actions are to be taken based on the status indication. For example, if the status indicates that the record is not found, the second access network instructs the wireless device to perform system re-entry. As another example, if the status indicates that the record is temporarily unavailable, the second access network instructs the wireless device to wait for a period of time for the information. According to certain embodiments, the second wireless network simply sends the status indication to the wireless device, and the wireless device determines the action to be performed based on the status indication.

Figure 3:
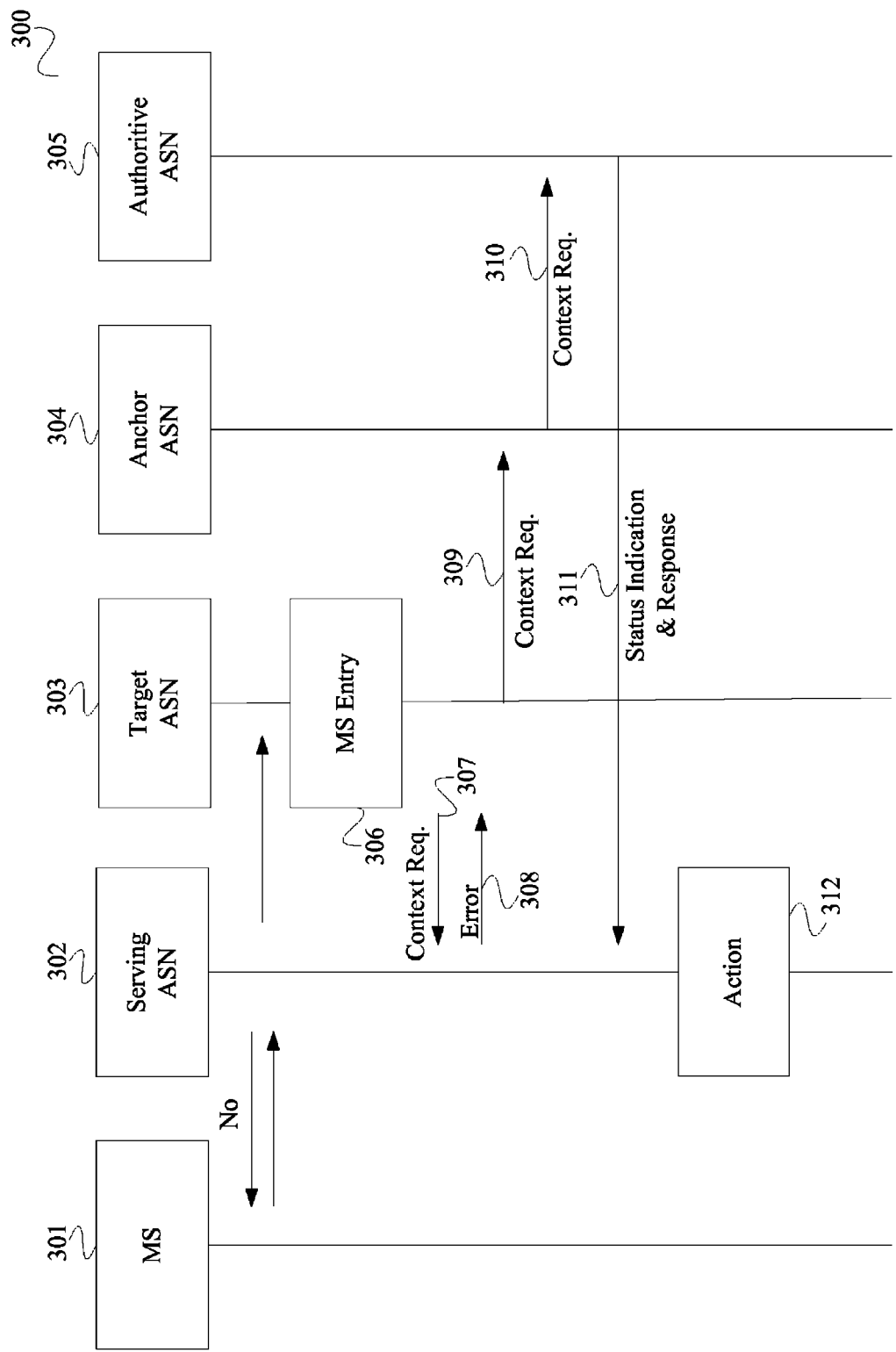
FIG. 3 is a simplified diagram illustrating a network handover process according to an embodiment of the present invention.

FIG. 3 is a simplified diagram illustrating a network handover process according to an embodiment of the present invention. This diagram is merely an example, which should not unduly limit the scope of the claims. One of ordinary skill in the art would recognize many variations, alternatives, and modifications.

As shown in FIG. 3, the network 300 includes a mobile station (MS) 301, a serving ASN 302, a target ASN 303, an anchor ASN 304, and an authenticator ASN 305. As an example, the network is in compliance with a WiMAX standard (a network architecture base on IEEE Std 802.16d/e wireless standard).

During a handover process, the MS 301 moves from one service area to the next. For example, the MS 301 was in an area served by the serving ASN 302. When the MS 301 moves to another area, which is served by the target ASN 303, a handover process needs to be performed. Among other things, the target ASN 303 needs context information associated with the MS 301. For example, context information includes location, connection speed, mode of services, and/or other information associated with the MS 301. If the target ASN 303 does not have the context information, the target ASN 303 sends a request for context information to the serving ASN 302. Due to one reason or another, the serving ASN 302 does not have the requested context information. In response, the serving ASN 302 sends an error indication to the target ASN 303.

The target ASN 303 then sends requests for context information to the anchor ASN 304. According to embodiments, the anchor ASN 304 provides various centralized services, in addition to providing wireless access to various wireless devices, associated with wireless services, such as the handover process and/or providing service metrics associated with wireless devices. The anchor ASN 304 forwards the request for the information to the authenticator ASN 305. As an example, the authenticator ASN 305 is the source for the requested information, which may be stored in a database component of the authenticator ASN 305. In response to the request, the authenticator ASN 305 may provide the request information or provide a status indication if the requested information is not available. For example, the requested information may be lost, temporarily unavailable, used by other entities, etc. Based on the determination, the authenticator ASN 305 sends a status indication (e.g., an error code). According to a specific embodiment, the status indication is in compliance with a WiMAX standard. For example, the format of the indication is provided below:

TABLE 1

| | |
|---|---|
| Type | TBD |
| Length in octets | 1 |
| Value | 01: Record no found |
| | 02: Record temporary unavailable |
| | 03: Administration reason |
| | 04-256: reserved |
| Description | This is error code for context request process. |

As shown in Table 1, different values in the status indication, or error code, are used to indicate different possibilities. As an example, the authenticator ASN 305 sends the status indication as a part of the response to the request for information. According to an embodiment, the response is transferred to the target ASN 303 through the anchor ASN 304. In another embodiment, the response is sent to the target ASN 303 directly.

The target ASN 303, based on the status indication, acts accordingly. For example, if the status indicates there is no record and/or context information found for the MS 301, the target ASN 303 causes the MS 301 to initiate a re-entry process. On the other hand, if the status indicates that the record and/or context information is temporarily unavailable, the target ASN 303 causes the MS 301 to wait for a period of time for the record to become available again. In another scenario, if the status indicates that the record and/or context information is unavailable for administration reason, the target ASN 303 does not provide any information to the MS 301 until the target ASN 303 later receives the context information for the MS 301.

Depending on the specific application, the status indication may be used differently. For example, if the target ASN 303 can't retrieve the necessary context due to error code "no record found" from the authenticator ASN 305, the target ASN 303 notifies MS to conduct full network re-entry. If the error code is "record temporary unavailable" or similar error which the second attempt may needed, the target ASN 303 initiates a timer associated with the error code in the message. In various embodiments, other operation can also use the error code as trigger to conduct the corresponding error handling operation.

It is to be appreciated that embodiments according to the present invention have a wide range of applications. For example, embodiments of the present invention are used for idle states of wireless devices.

Idle states are useful in wireless networks for various reasons. For example, idle mode is intended as a mechanism to allow the wireless device to be periodically available for downlink broadcast traffic messages without being registered at a specific base station, as the wireless devices traverse an air link environment populated by multiple base stations, typically over a large geographic area. Among other things, idle mode helps wireless device by removing the active requirement for handover process and/or other normal operation requirements. For example, by restricting activities of wireless devices to scanning only at discrete intervals, idle mode helps the wireless devices to conserve power and operational resources. In addition, idle mode is beneficial to the network and base stations by providing a simple and timely method for alerting the wireless devices to receive pending downlink traffic directed toward wireless devices, and by eliminating air interface and network HO traffic from essentially inactive MS.

In order for a network to know the location of a wireless device that is in the idle mode, the wireless device needs to conduct periodic location update procedure to let the network knows which ASN is currently serving the wireless device. However, under certain instances, the paging controller and/or the serving ASN do not have the location update information.

Figure 4:
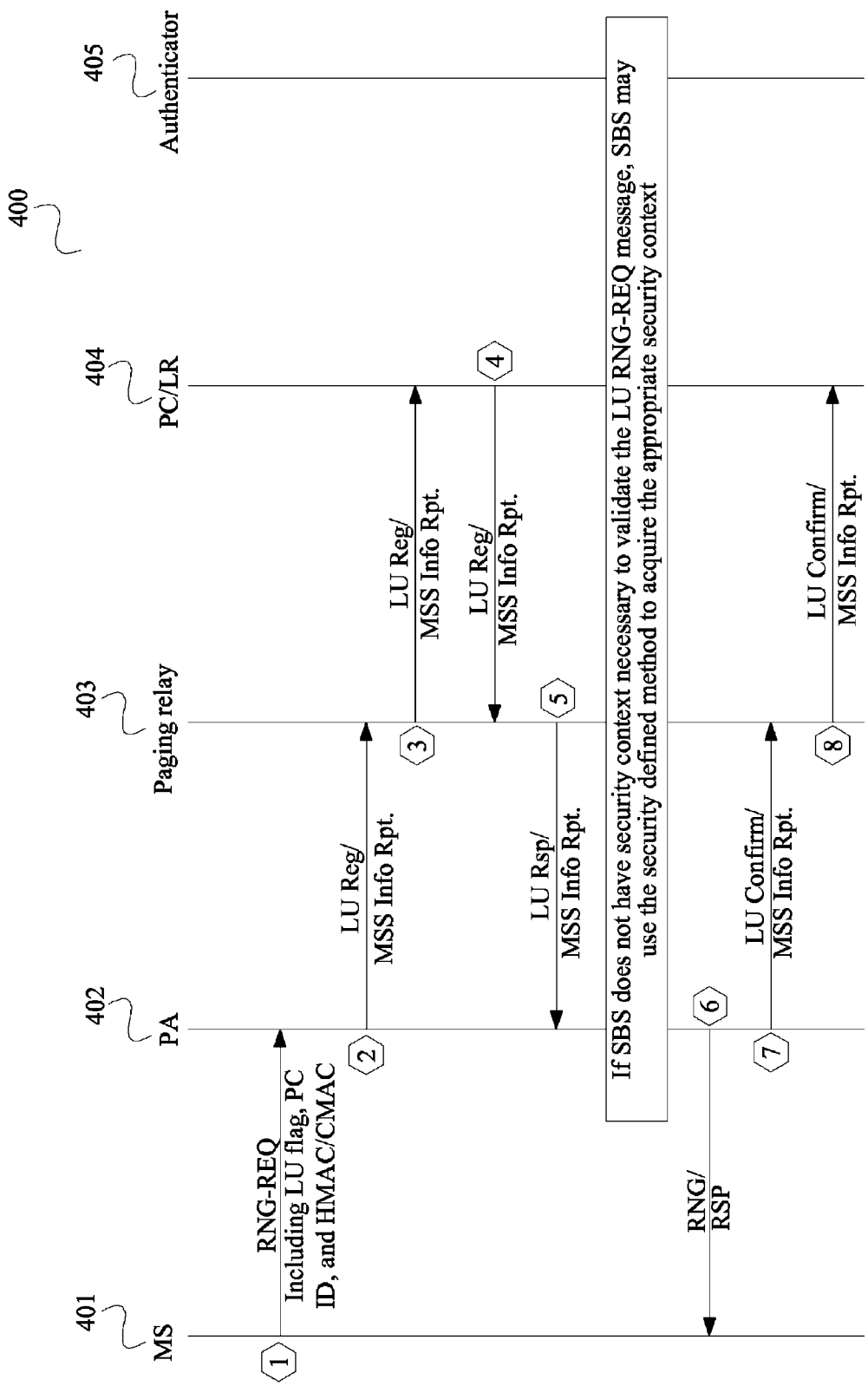
FIG. 4 is a simplified diagram illustrating operation of a wireless device in a network in an idle state according to an embodiment of the present invention.

FIG. 4 is a simplified diagram illustrating operation of a wireless device in a network in an idle state according to an embodiment of the present invention. This diagram is merely an example, which should not unduly limit the scope of the claims. One of ordinary skill in the art would recognize many variations, alternatives, and modifications.

As shown in FIG. 4, a network 400 includes, among other things, a mobile station (MS) 401, a paging agent (PA) 402, a paging relay (PR) 403, a paging controller (PC) 404, and an authenticator 405.

As an example, paging updates refers to procedures used by a network to seek an MS in idle mode in the coverage area of a predefined set of base stations (BS) identified by a Paging Group (e.g., as per IEEE Std 802.16e specification). Typically, paging update refers to procedures for obtaining location update or network entry from an MS in idle mode. For example, paging procedures are implemented using Paging MAC message exchanges between MS and BS, under the control of a higher-layer paging management functions.

According to an embodiment, the PC 404 is a functional entity that administers the activity of idle mode MS 401 in the network 400. For example, the PC 404 is identified by a PC ID (6 bytes) in compliance with the IEEE Std 802.16e, which could map to the address of a functional entity. Depending on the application, there are various types of PCs. For example, for each idle mode MS, there is an anchor PC that contains the updated location information of the MS. As another example, when there are more than one PCs in the network, there can be one or more relay PCs that participate in relaying paging and location management messages between the PA and the Anchor PC. Depending on the application, a PC may include location registers (LR) for stored information related to the location of wireless devices.

As an example, a paging agent is a functional entity that handles the interaction between PC and IEEE Std 802.16e specified paging related functionalities. For example, PAs are implemented as a part of base stations (BS).

An exemplary embodiment describing a location update process is provided below.

First, the MS 401 initiates a Location Update (LU) process. In an embodiment, the Location Update process is forced by network 400 if certain conditions as described in IEEE Std 802.16e specification are met. To perform this process, the MS 401 sends a message (RNG_REQ). For example, Ranging Purpose Indication is provided in accordance with the IEEE Std 802.16e specification, which indicates that the MS intends to update its location. Typically, a PC ID (e.g., identification that points to the PC that acts as MS's Anchor PC) is present.

Next, the PA 402 sends an LU Request to the PR 403. For example, the LU Request contains MS ID, PC ID, BS ID, etc.

The paging relay 403 sends the LU Request to Anchor PC 404. According to various embodiments, the request contains information related to MS ID, BS ID, recommended paging parameters page group (PG) ID, paging cycle, paging offset, etc.

If the LU-Request is accepted by the Anchor PC 404, the Anchor PC either accepts the recommended paging parameters or assigns new PG ID and other paging parameters and sends LU Response message to Paging relay. Depending on the situation, the PC 404 may or may not have information associated with the LU request. For example, the information may be deleted, temporarily unavailable, etc. If the information is unavailable, the PC 404 provides a status indication regarding the requested information. For example, the status indication may include the following information as shown in Table 2:

TABLE 2

| Type | TBD |
|---|---|
| Length in octets | 1 |
| Value | 01: Record no found |
| | 02: Record temporary unavailable |
| | 03: Administration reason |
| | 04-256: reserved |
| Description | This is error code for context request process. |

In addition to the status information, the LU response may include other information as well. For example, the LU Response includes: MS ID, BS ID, PG ID and paging parameters, Anchor Authenticator ID, PCID etc.

The paging relay 403 forwards LU Response to the PA 402. As shown in FIG. 4, throughout the process of communicating LU information, the authenticator 405 is used to provide security to ensure the information is not used without authorization.

The PA 402 determines whether it has a valid response for the MS ID from the indicated authenticator 406. For example, if the MS ID information is not available, the SBS sends an AK request (not shown in the diagram) to the authenticator 405. As merely an example, the AK response (not shown) provides an AK sequence number, as well as the AK for the connection between the MS and the PA. Depending on the application, the AK response may be implemented as a part of the wireless protocol.

According to an embodiment, the PA (e.g., the BS) uses AK response to verify the authenticity of the RNG-REQ message received from MS. For example, if the MS's RNG-REQ message is verified as authentic, the PA responds to the MS with RNG-RSP message, which includes various information, such as the hash of the authentication digest (HMAC/CMAC), etc. On the other hand, if the RNG-REQ message can not be authenticated (such as when the Anchor Authenticator could not provide an AK), the PA initiates an "Unsecure Location Update" sequence by initiating re-authentication.

More specifically, where RNG-REQ message is authenticated, the 402 PA sends an LU Confirm message to the paging relay 403. For example, the LU Confirm message includes, among other things, MSID, BSID, success indication, etc. For example, the message indicates that the location update from MS has been authenticated and the process is successfully completed.

The paging relay 403 forwards LU Confirm message to PC 404.

Once the PC 404 receives LU Confirm message, it updates MS location information that is stored at the LR. For example, if the location update process is triggered by paging the MS, the PC/LR initiates a procedure to cancel the paging process. For example the PC 404 sends a Paging Announce message to stop the paging operation within the paging groups.

Depending on the application, various steps as described above may be added, removed, rearranged, repeated, replaced, modified, and/or overlapped, and they should not unduly limit the scope of claims.

According to an embodiment, the present invention provides a method of providing wireless services. The method includes providing a wireless communication network. The wireless communication network includes a wireless device, a first access network and a second access network. The first access network includes a first data associated with the wireless device. The method also includes sending a first request for service by the wireless device to the second access network. The method additionally includes determining by the second access network whether the second access network has a second data for serving the wireless device. Also, the method includes sending a second request by the second access network to the first access network if the second access network does not have the second data. The second request is associated with serving the wireless device. In addition, the method includes determining a status indication of the first data by the first access network. The status is based on a plurality of possible errors. The method further includes sending the status indication from the first access network to the second access network. Furthermore, the method includes determining whether to initiate a network initiation process for the wireless device base on the status indication. For example, the embodiment is illustrated according to FIG. 2.

According to another embodiment, the present invention provides a method of providing wireless services. The method includes providing a wireless communication network. The wireless communication network includes a wireless device, a paging controller and a paging agent. The paging controller includes a first data associated with the wireless device. The first data is associated with a location. The method further includes sending a first request for service by the wireless device to the paging agent. The first request is associated with a location update. The method additionally includes determining by the paging agent whether the paging agent has a second data for serving the wireless device. In addition, the method includes sending a second request by the paging agent to the paging controller if the paging agent does not have the second data. The second request is associated with serving the wireless device. The method further includes determining a status indication of the first data by the paging controller. For example, the status is based on a plurality of possible errors. The method also includes sending the status indication from the paging controller to the paging agent. Moreover, the method includes determining whether to initiate a network initiation process for the wireless device base on the status indication. Furthermore, the method includes determining whether to initiate a network initiation process for the wireless device base on the status indication. For example, the embodiment is illustrated according to FIG. 4.

According to yet another embodiment, the present invention provides a method of providing wireless services. The method includes providing a wireless communication network. For example, the wireless communication network includes a wireless device, a first access network and a second access network. The second access network includes a first data associated with the wireless device. The first data includes a first context information. The method also includes initiating a handover process by the first access network. The method additionally includes determining whether the first access network has a second data for serving the wireless device. The second data includes a second context information associated with the wireless device. The method also includes sending a second request by the first access network to the second access network if the first access network does not have the second data. The second request is associated with serving the wireless device. Moreover, the method includes determining a status indication of the first data by the second access network. The status is based on a plurality of possible errors. The method further includes sending the status indication from the second access network to the first access network. Moreover, the method includes determining whether to initiate a network initiation process for the wireless device base on the status indication. Furthermore, the method includes determining whether to initiate a network initiation process for the wireless device base on the status indication. For example, the embodiment is illustrated according to FIG. 2.

Figure 1:
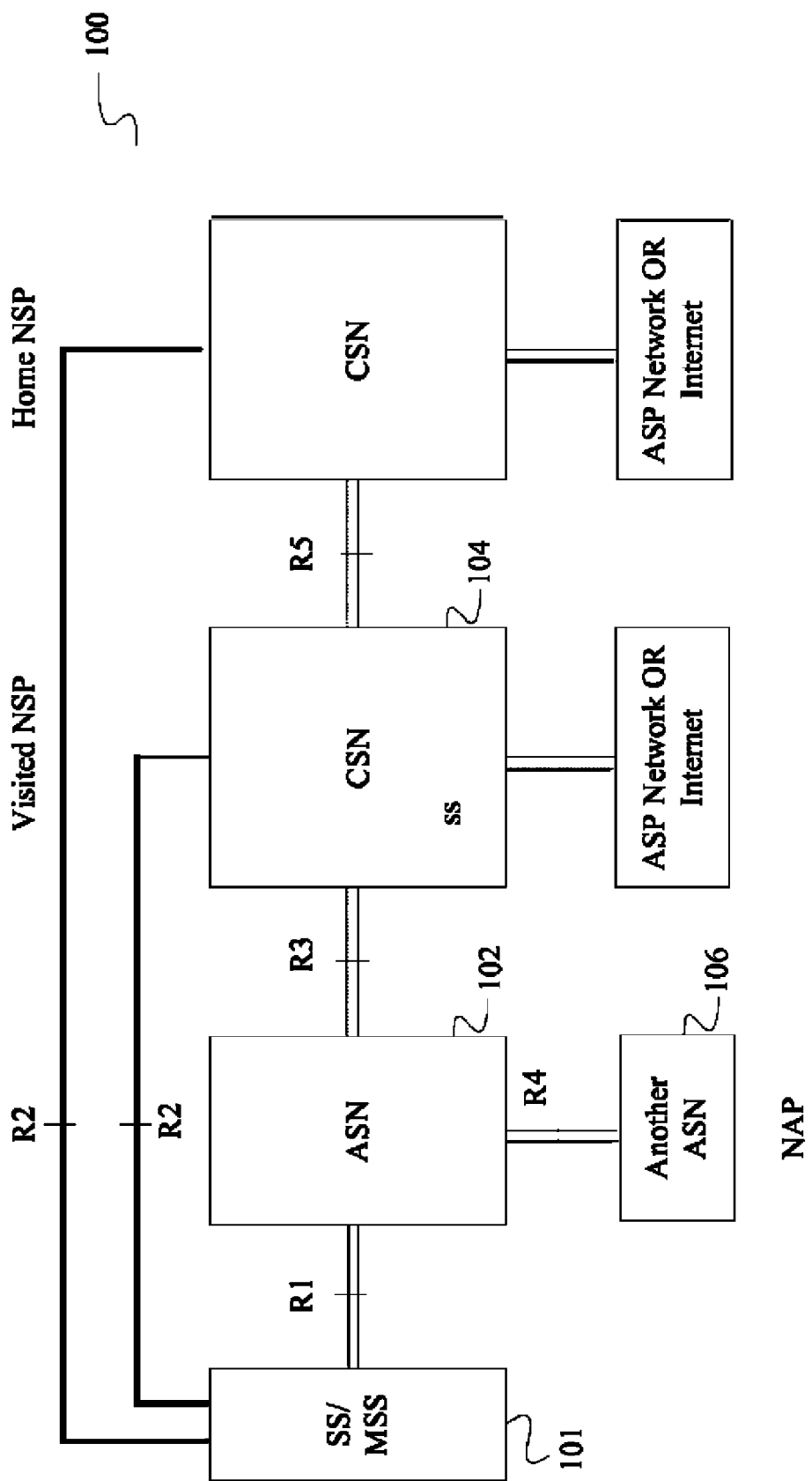
FIG. 1 is a simplified diagram illustrating a conventional telecommunication network.

According to yet another embodiment, the present invention provides a system for providing wireless service to wireless devices. The system includes a wireless device. The system also includes a first access network. The first access network is configured to provide wireless access to the wireless device. The system also includes a second access network. For example, the second access network includes information associated with the wireless device. The first access network determines whether the first access network has a first data. The first data is associated with serving the wireless device. The first access network sends a request to the second access network if the first access network does not have the second data. The request is associated with serving the wireless device. The second access network provides a status indication of the information. The status indication is based on a plurality of possible errors. The second access network sends the status indication to the first access network. Furthermore, the method includes determining whether to initiate a network initiation process for the wireless device base on the status indication. For example, the embodiment is illustrated according to FIGS. 1 and 2.

It is to be appreciated that the various embodiments of the present invention provide advantages over conventional techniques. In various embodiments, the present invention provides a scheme for efficient handling of information associated with serving wireless devices. In a specific embodiment, the present invention provides an efficient error handling scheme for handover process. In another embodiment, the present invention provides an effective way to handle idle states of mobile stations. For example, by providing specific indication for information associated with wireless devices, embodiments of the present invention allow network system to operate more effectively. In addition, it is to be appreciated that embodiments of the present invention can be implemented for conventional network techniques and standards. For example, various embodiments of the present invention are compatible with conventional techniques and easily implemented. There are other benefits as well.

It is also understood that the examples and embodiments described herein are for illustrative purposes only and that various modifications or changes in light thereof will be suggested to persons skilled in the art and are to be included within the spirit and purview of this application and the scope of the appended claims.

What is claimed is:

1. A method of operating in a wireless communication network that includes a wireless device, a first access network and a second access network, wherein the first access network includes a first data associated with the wireless device, the method comprising:
receiving a first request for service from the wireless device at the second access network;
determining by the second access network whether the second access network has a second data for serving the wireless device;
sending a second request from the second access network to the first access network if the second access network does not have the second data, the second request being associated with serving the wireless device;
receiving a status indication from the first access network at the second access network, the status indication being based on one of a plurality of possible errors;
determining whether to perform a network initiation process for the wireless device base on the status indication, the network initiation process including performing a network entry cycle for the wireless device; and
performing the network initiation process for the wireless device if the status indication indicates a record associated with the wireless device is not found.

2. The method of claim 1 wherein the plurality of possible error includes administrative error.

3. The method of claim 1 wherein the plurality of possible error includes a temporary unavailability.

4. The method of claim 1 wherein the plurality of possible error includes a unavailable record.

5. The method of claim 1 wherein the plurality of possible error includes record not found.

6. The method of claim 1 wherein the first request comprises a location update request.

7. The method of claim 1 wherein the first request comprises a handover request.

8. The method of claim 1 wherein the second request comprises a handover request.

9. The method of claim 1 wherein the first access network comprises an paging agent.

10. The method of claim 1 wherein the wireless communication network is a WiMAX wireless network.

11. The method of claim 1 wherein the second access network is a paging controller.

12. The method of claim 1 wherein the second access network is an anchor access network.

13. The method of claim 1 wherein the second access network comprises a location register, the location register being configured to store information associated with a plurality of wireless devices.

14. The method of claim 1 wherein the second access network comprises a database.

15. A method of operating in a wireless communication network that includes a wireless device, a paging controller and a paging agent, wherein the paging controller includes a first data associated with the wireless device, the first data being associated with a location, the method comprising:

receiving a first request for service from the wireless device at the paging agent, the first request being associated with a location update;

determining by the paging agent whether the paging agent has a second data for serving the wireless device;

sending a second request from the paging agent to the paging controller if the paging agent does not have the second data, the second request being associated with serving the wireless device;

receiving a status indication of the first data from the paging controller at the paging agent, the status indication having been determined by the paging controller, the status indication being based on a plurality of possible errors;

determining whether to initiate a network initiation process for the wireless device base on the status indication.

16. The method of claim 15 further comprising relaying the second request by a paging relay.

17. The method of claim 15 further comprising causing the wireless device to initiate the network initiation process if the first data is unavailable.

18. The method of claim 15 further comprising causing the wireless device to wait for a predetermined time if the first data is temporarily unavailable.

19. The method of claim 15 further comprising sending the first data after a predetermined time if the first data is being accessed by a different entity.

20. A method of operating in a wireless communication network that includes a wireless device, a first access network and a second access network, wherein the second access network includes a first data associated with the wireless device, the first data including a first context information, providing wireless services the method comprising:

initiating a handover process by the first access network;

determining whether the first access network has a second data for serving the wireless device, the second data including a second context information associated with the wireless device;

sending a second request from the first access network to the second access network if the first access network does not have the second data, the second request being associated with serving the wireless device;

receiving a status indication of the first data from the second access network at the first access network, the status indication having been determined by the second access network, the status indication being based on a plurality of possible errors; and determining whether to initiate a network initiation process for the wireless device base on the status indication.

21. The method of claim 20 wherein first access network is a serving ASN.

22. The method of claim 20 wherein first access network is an anchor ASN.

23. The method of claim 20 wherein first access network is an authentication ASN.

24. A system for providing wireless service to wireless devices, the system comprising:

a first access network, the first access network being configured to provide wireless access to a wireless device;

a second access network, the second access network including information associated with the wireless device;

wherein:

the first access network determines whether the first access network has a first data, the first data being associated with serving the wireless device;

the first access network sends a request to the second access network if the first access network does not has the first data, the request being associated with serving the wireless device;

the second access network provides a status indication of the information, the status indication being based on a plurality of possible errors;

the second access network sends the status indication to the first access network;

the first network determines whether to perform a network initiation process for the wireless device based on the status indication, the network initiation process including performing a network entry cycle for the wireless device; and the first network performs the network initiation process for the wireless device if the status indication indicates a record associated with the wireless device is not found.

25. The system of claim 24 further comprising a third access network being configured to provide wireless access to the wireless device after a handover process.

* * * * *

UNITED STATES PATENT AND TRADEMARK OFFICE
CERTIFICATE OF CORRECTION

| | |
|---|---|
| PATENT NO. | : 7,831,253 B2 |
| APPLICATION NO. | : 11/752840 |
| DATED | : November 9, 2010 |
| INVENTOR(S) | : Barber et al. |

It is certified that error appears in the above-identified patent and that said Letters Patent is hereby corrected as shown below:

In Col. 13, line 52, claim 20, delete "providing wireless services".

Signed and Sealed this
Twenty-eighth Day of December, 2010

David J. Kappos
*Director of the United States Patent and Trademark Office*